United States Patent [19]

Maudlin

[11] 4,155,529
[45] May 22, 1979

[54] MOTOR MOUNT

[75] Inventor: Wendell E. Maudlin, York, Pa.

[73] Assignee: Borg-Warner Corporation, Chicago, Ill.

[21] Appl. No.: 869,566

[22] Filed: Jan. 16, 1978

[51] Int. Cl.² .............................................. F16F 15/04
[52] U.S. Cl. ................................... 248/604; 416/500; 417/363
[58] Field of Search ...................... 248/26, 15, 358 R; 416/500; 417/363; 310/62, 63, 91

[56] References Cited

U.S. PATENT DOCUMENTS

| 1,991,339 | 2/1935 | Ullman | 248/26 X |
| 2,686,630 | 8/1954 | Burrowes | 417/363 X |
| 2,975,960 | 3/1961 | Atalla | 417/363 X |
| 3,159,108 | 12/1964 | Mullings | 417/363 X |
| 3,773,285 | 11/1973 | Morrill | 248/15 |
| 3,847,330 | 11/1974 | Morrison | 417/363 X |

OTHER PUBLICATIONS

General Electric Bulletin GEA 10391 1-77 (5-M), part that describes the General Electric "Torsion Flex System".

Primary Examiner—J. Franklin Foss
Attorney, Agent, or Firm—Thomas B. Hunter

[57] ABSTRACT

A motor mount suitable for use, for example, in a motor driven fan assembly or the like in which the motor is secured to the fan housing. The mount includes clamps for supporting the opposite ends of the motor and is adjustable to accommodate motors having different lengths and also to fit different sized mounting bolt locations.

2 Claims, 3 Drawing Figures

U.S. Patent
May 22, 1979
4,155,529
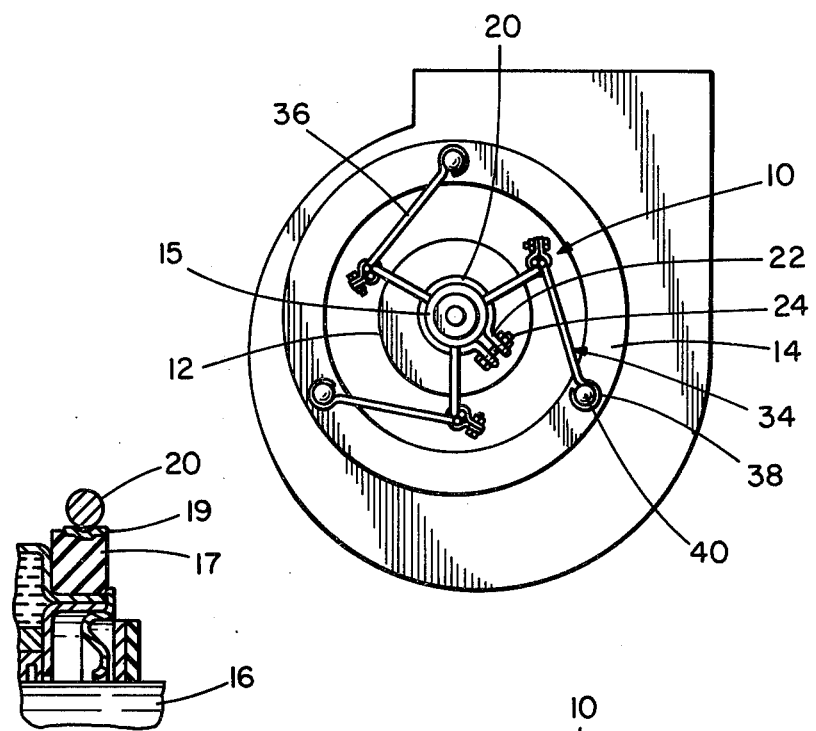
FIG. 1
FIG. 3
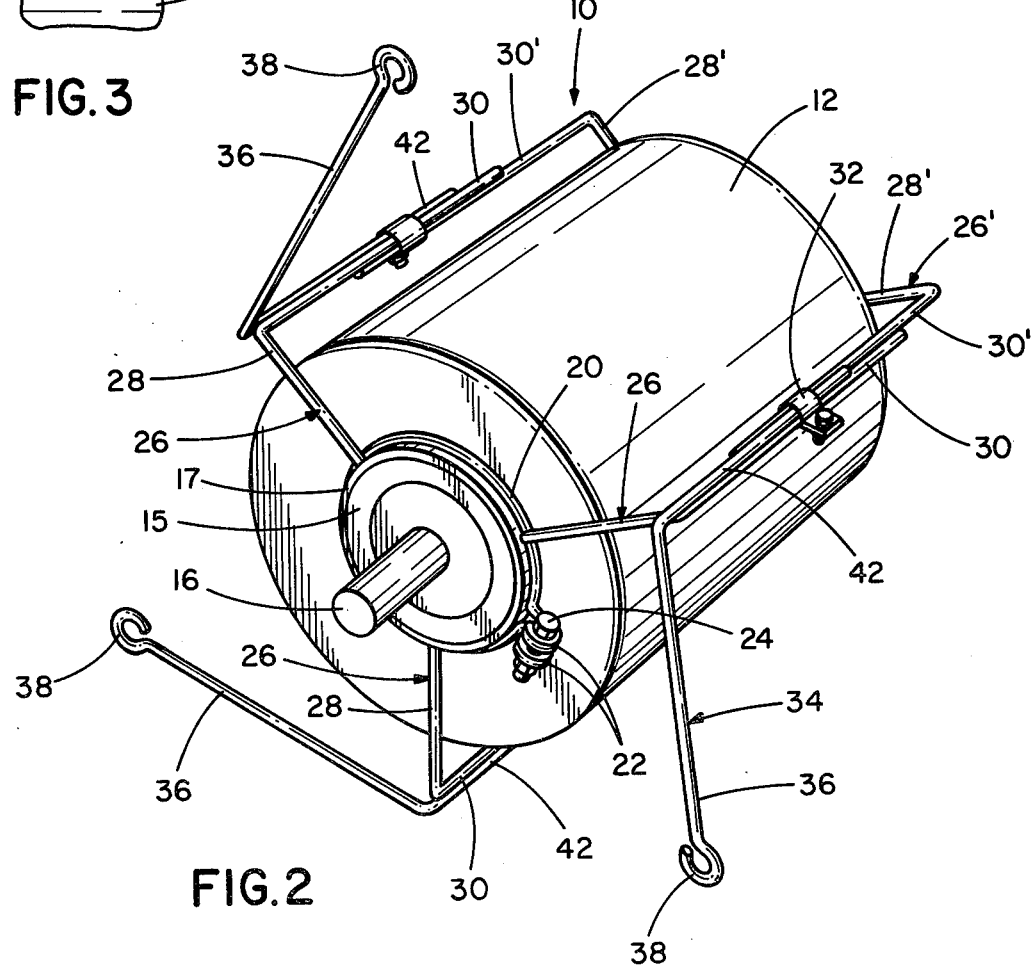
FIG. 2

MOTOR MOUNT

BACKGROUND OF THE INVENTION

1. Field of the Invention

Motor mounting brackets or supports generally classified in Class 248.

2. Description of the Prior Art

General Electric Bulletin GEA 10391 1-77 (5-M) describes the General Electric "torsion flex system" and other types of motor mounts including a resilient ring mounting system and a bellyband mounting system.

SUMMARY OF THE INVENTION

The general engineering objectives for motor mounts of the type to which the present invention pertains are: (1) low cost with ease of fabrication and minimum scrap; (2) resiliency in order to absorb and dissipate vibration; and (3) adaptability to accommodate a variety of motors having different lengths and/or mounting bolt locations. The motor mount of the present invention accomplishes all three of the foregoing objectives in that it can be fabricated primarily of heavy gauge wire stock, thus eliminating scrap inherent in the manufacture of sheet metal brackets of the type shown in the GE Bulletin mentioned above. Also, by using two independent mounting clamp sections at opposite ends of the motor, with the two sections adjustably connected together, motors of different lengths can be accommodated. Also, the supporting arms which secure the clamps to the fan housing, or other base, are radially adjustable within certain limits to permit the same unit to be used with different sized fan housings. This design provides a virtual "one size fits all" motor support which can achieve substantial savings in the manufacture and inventorying of these units.

BRIEF DESCRIPTION OF THE DRAWINGS

FIG. 1 is an elevation view of the motor mount shown in place and supporting a motor within a fan housing;

FIG. 2 is a perspective view of the motor and mount; and

FIG. 3 is a partial cross-section view of one end of the motor.

DETAILED DESCRIPTION OF THE PREFERRED EMBODIMENT

As shown in FIG. 1, the motor mount generally designated at 10 is adapted to support a motor 12 within fan housing 14; and the driven shaft 16 of the motor is connected to a blower wheel (not shown). It will be appreciated that the mounting system has general application and is not limited to a motor-fan combination.

The motor, as is conventional, is provided with a short extension or boss 15 at opposite ends which surrounds the motor shaft 16. The extension (see FIG. 3) has an annular resilient ring 17 fitted over it, said ring being encircled by a metal band 19 bonded to its outside diameter. It should be noted that the end of the motor which cannot be seen in FIG. 2 is essentially the same as the end which is visible.

Mount 10 is made up, in part, of two essentially identical and complementary support elements fabricated, for the most part, of heavy gauge wire stock. For convenience, the parts of one element (at the rear of FIG. 2) will be designated with the same reference numerals as the element in front, but in combination with a prime (') after such numeral. Around metal band 19 on each of the bearing extensions 15 is a clamp portion 20 of the motor mount, said clamp being generally C-shaped and provided with tabs 22 at the ends to receive a fastener 24 which draws down the clamp around the bearing extension 15 to securely fasten the clamp to the motor. Each clamp is attached to a plurality (three being shown) of support arms 26 (26') each of which has a generally radially extending section 28 (28') and another section 30 (30') projecting at a right angle to section 28 (28'). When the two units are positioned in place, and the clamp portions 20 fastened around the motor, the axially extending section of the support arms 30 and 30' are adjacent to one another and are secured to each other by means of clamps 32 which also connect the arms to the spider elements 34. Each of the spider element arms includes a first section 36 which is formed with an eyelet 38 at the distal end to accommodate a mounting bolt 40 (FIG. 1) and another section 42 which is parallel to the support arms in the clamped position and is secured thereto by clamps 32. The spider elements may be adjusted by merely pivoting the arms around the axis of sections 42 to accommodate different locations of the mounting bolts 40. Thus, the distance between the central axis of the motor and the distal end of each spider arm may be varied within predetermined limits.

While this invention has been described in connection with certain specific embodiments thereof, it is to be understood that this is by way of illustration and not by way of limitation; and the scope of the appended claims should be construed as broadly as the prior art will permit.

What is claimed is:

1. A mount for supporting a motor or similar device in fixed relation to the apparatus being driven by said motor, said motor being secured to a housing associated with said apparatus, said mount comprising:

a first C-shaped motor clamping element engaging a surface at one end of said motor.

a second C-shaped motor clamping element engaging a surface at the other end of said motor, each of said first and second clamping elements including a plurality of support arms secured thereto, said support arms having a first portion extending generally radially from the axis of said motor and a second portion extending generally parallel to the axis of said motor, said second portions of said support arms on said first clamping element being adjustable along an axis parallel to the axis of said motor for co-operative engagement with said second portions of said support arms on said second clamping element so as to accommodate motors of different lengths;

means for detachably securing said first and second clamping elements to the ends of said motor;

a plurality of spider arms, each of said spider arms having an axially extending portion parallel to the second portions of the support arms on the first and second clamping elements and a radially extending portion provided with eyelet means at its distal end to accommodate a mounting bolt securing it to said housing, said radially extending portions of said spider arms being adjustably rotated, within limits, relative to the second portions of the support arms on said first and second clamping elements to vary its radial distance between said eyelet means and the axis of said motor to accommodate different locations of mounting bolts on said housing; and means for detachably securing said axially extending portions of said spider arms to said second portions of the support arms on said first and second clamping elements.

2. Apparatus as defined in claim 1 wherein said clamping elements, said support arms and said spider arms are all formed of heavy gauge wire stock.

* * * * *